United States Patent [19]
Estrera et al.

[11] Patent Number: 6,087,649
[45] Date of Patent: Jul. 11, 2000

[54] NIGHT VISION DEVICE HAVING AN IMAGE INTENSIFIER TUBE, MICROCHANNEL PLATE AND POWER SUPPLY FOR SUCH AN IMAGE INTENSIFIER TUBE, AND METHOD

[75] Inventors: Joseph P. Estrera, Dallas; Timothy W. Sinor, Plano; Michael R. Saldana, New Braunfels, all of Tex.

[73] Assignee: Litton Systems, Inc., Woodland Hills, Calif.

[21] Appl. No.: 09/025,353

[22] Filed: Feb. 18, 1998

Related U.S. Application Data

[63] Continuation-in-part of application No. 08/901,419, Jul. 28, 1997, Pat. No. 5,949,063.
[51] Int. Cl.[7] .................................................. H01J 40/14
[52] U.S. Cl. ................................ 250/214 VT; 250/214 R
[58] Field of Search ..................... 250/214 VT, 214 RC, 250/214 R; 313/524, 528, 537, 105 CM, 130 R, 542–544, 130 CM

[56] References Cited

U.S. PATENT DOCUMENTS

| | | | |
|---|---|---|---|
| 3,720,535 | 3/1973 | Parish et al. | 427/77 |
| 3,742,224 | 6/1973 | Einstein | 250/214 VT |
| 3,777,201 | 12/1973 | Einstein | 250/214 VT |
| 4,037,132 | 7/1977 | Hoover | 250/214 VT |
| 4,442,349 | 4/1984 | Blom et al. | 250/222.1 |
| 4,882,481 | 11/1989 | Gilligan et al. | 250/214 VT |
| 5,146,077 | 9/1992 | Caserta et al. | 250/214 VT |
| 5,747,792 | 5/1998 | Kintz et al. | 250/214 VT |
| 5,756,989 | 5/1998 | Bear et al. | 250/214 VT |

*Primary Examiner*—Que T. Le

[57] ABSTRACT

A night vision device with an image intensifier tube includes an improved power supply which operates the image intensifier tube of the device according to a variable duty cycle either at a design voltage level for the tube or at a voltage level simulating a dark-field. This duty cycle variation is effected as a function of the current flow in the image intensifier tube in order to provide automatic brightness control and bright source protection. An improved service life for the image intensifier tube is achieved. Also, a microchannel plate of the image intensifier tube need not carry an ion barrier film, resulting in an improved light amplification for the image intensifier tube.

20 Claims, 6 Drawing Sheets

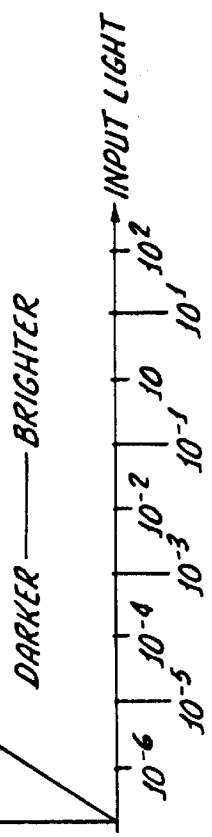
Fig. 4.
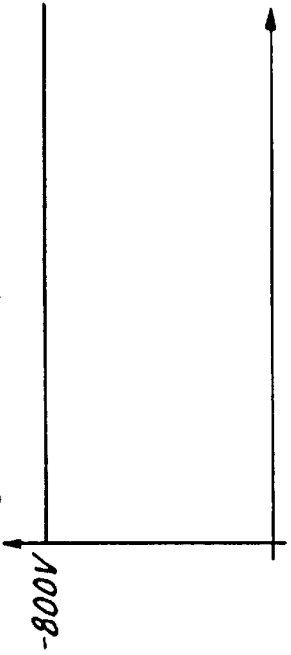
Fig. 5.
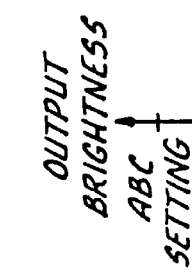
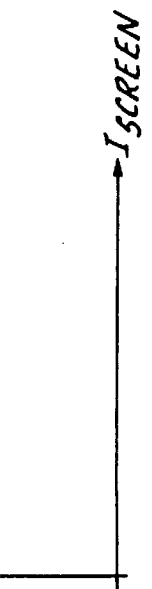
Fig. 7.
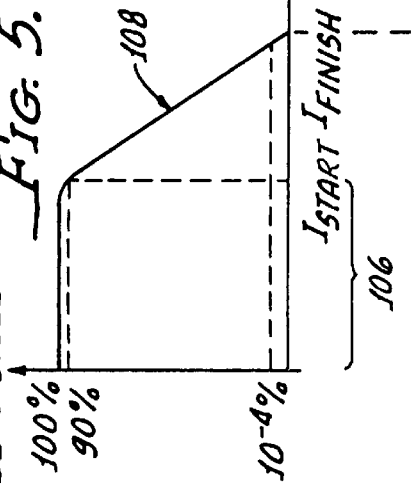
Fig. 8.

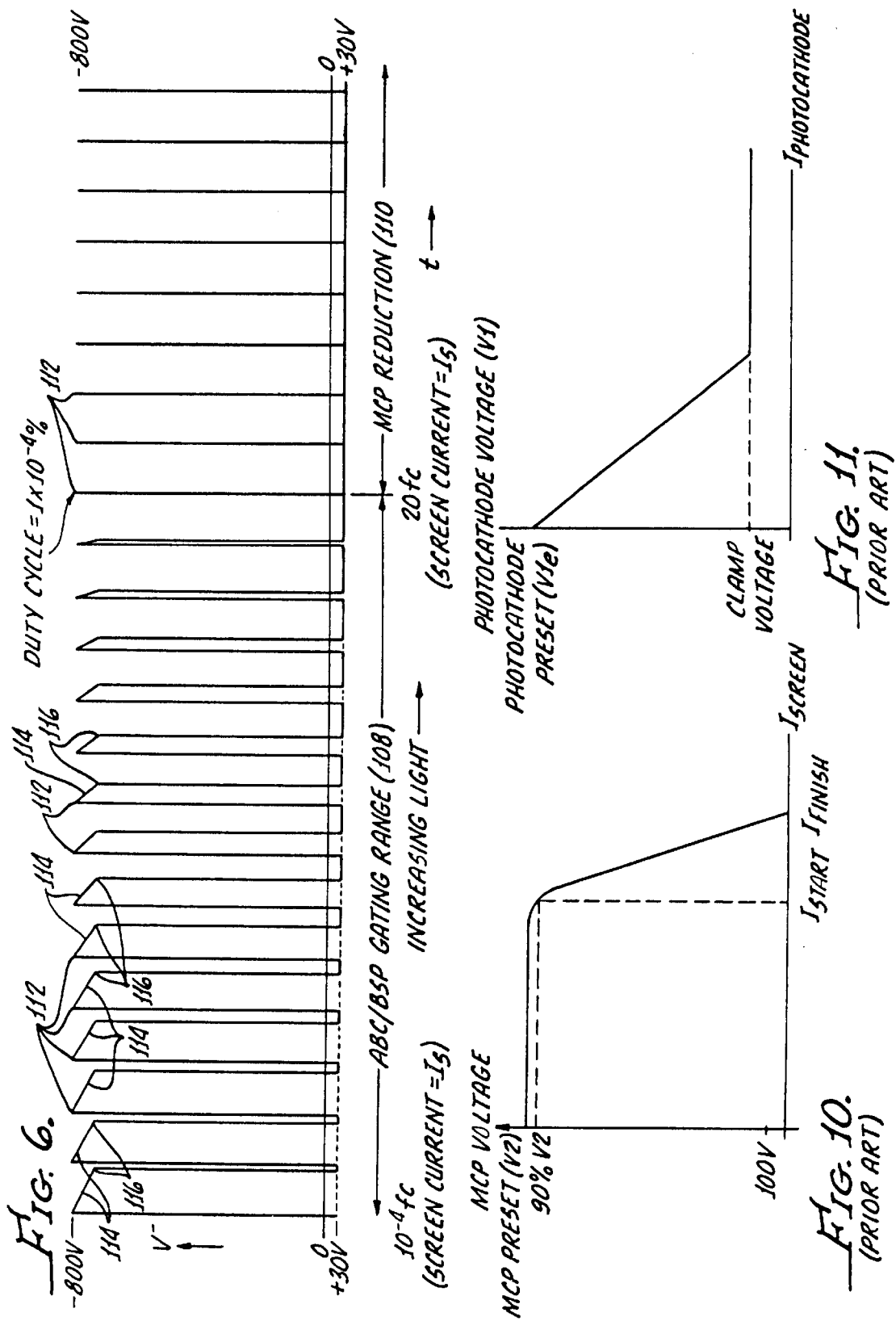

NIGHT VISION DEVICE HAVING AN IMAGE INTENSIFIER TUBE, MICROCHANNEL PLATE AND POWER SUPPLY FOR SUCH AN IMAGE INTENSIFIER TUBE, AND METHOD

CROSS REFERENCE TO RELATED APPLICATION

The present application is a continuation in part of application Ser. No. 08/901,419, filed Jul. 28, 1997, now U.S. Pat. No. 5,949,063.

FIELD OF THE INVENTION

The present invention is generally in the field of night vision devices of the light-amplification type. Such night vision devices employ an image intensifier tube ($I^2T$) to receive photons from a scene. This scene may be illuminated by full day light; or the scene may be illuminated with light which is either of such a low level, or of such a long wavelength (i.e., infrared light), or both, that the scene is invisible or is only dimly visible to the natural human vision. The $I^2T$ responsively provides a visible image replicating the scene.

More particularly, the present invention relates to an improved night vision device having an $I^2T$ with a low level of ion feedback, and to an improved power supply for an $I^2T$ achieving an extended operating life. A method of operating an $I^2T$ and a method of operating a power supply for such a tube are both disclosed.

BACKGROUND OF THE INVENTION

Even on a night which is too dark for natural human vision, invisible infrared light is richly provided by the stars. Human vision cannot utilize this infrared night-time light from the stars because the so-called near-infrared portion of the spectrum is invisible for humans. Under such conditions, a night vision device of the light amplification type can provide a visible image replicating the night time scene. Such night vision devices generally include an objective lens which focuses invisible infrared light from the night-time scene onto the transparent light-receiving face of an image intensifier tube ($I^2T$). At its opposite image-face, the $I^2T$ provides an image in visible yellow-green phosphorescent light, which is then presented to a user of the device via an eye piece lens.

A contemporary night vision device will generally use an $I^2T$ with a photocathode behind the light-receiving face of the tube. The photocathode is responsive to photons of infrared light to liberate photoelectrons. These photoelectrons are moved by a prevailing electrostatic field to a microchannel plate having a great multitude of dynodes, or microchannels. These dynodes or microchannels have an interior surface substantially defined by a material of high emmisivity of secondary electrons. In other words, each time an electron (whether a photoelectron or an electron previously emitted by the microchannel plate) collides with this interior surface material, more than one electron (i.e., secondary-emission electrons) leaves the site of the collision. This process of secondary electron emissions is not an absolute in each case, but is a statistical process. The photoelectrons entering the microchannels thus cause a geometric cascade of secondary-emission electrons moving along the microchannels so that a spatial output pattern of electrons which replicates an input pattern (but at a considerably higher electron density than the input pattern) issues from the microchannel plate. This pattern of electrons is moved from the microchannel plate to a phosphorescent screen electrode by another electrostatic field. When the electron shower from the photocathode impacts on and is absorbed by the phosphorescent screen electrode, a visible image is produced. This visible image is passed out of the tube through a transparent window for viewing.

A conventional power supply for a conventional $I^2T$ provides the electrostatic field potentials referred to above, and also provides a field and current flow to the microchannel plate(s). This power supply provides the necessary voltage levels to provide the required electrostatic fields maintained within the image intensifier tube to move electrons from the photocathode to the screen electrode. Unavoidably, these electrostatic fields also move any positive ions which exist within the image intensifier tube toward the photocathode. Because such positive ions may include gas atoms of considerable size, they are able to impact upon and cause damage to the photocathode of many conventional image intensifier tubes. This impact of positive ions on the photocathode contributes to a relatively short operating life for many early-generation image intensifier tubes. As those ordinarily skilled in the pertinent arts will understand, later generation image intensifier tubes of the proximity focus type have partially solved this ion-impact problem by providing an ion barrier film on the inlet side of the microchannel plate.

This ion barrier film itself, however, is not without disadvantages. A recognized disadvantage of such an ion barrier film on a microchannel plate is the decreased gain provided by the microchannel plate between a photocathode of an image intensifier tube and the output screen electrode of the tube. That is, the ion barrier film also acts as a barrier preventing some of the photoelectrons liberated from the photocathode of the tube from reaching the microchannels of the microchannel plate. In some cases, as much as 50% of the electrons liberated from the photocathode of the $I^2T$ and approaching the microchannel plate will be blocked and will not reach the microchannels to be amplified as described above. Thus, about the same percentage of the image information which theoretically could be provided by this tube is lost.

U.S. Pat. No. 3,720,535, issued Mar. 13, 1973; U.S. Pat. No. 3,742,224, issued Jun. 26, 1973; and U.S. Pat. No. 3,777,201, issued Dec. 4, 1973 provide examples of microchannel plates or image intensifier tubes having an ion barrier film on a microchannel plate.

Further to the above, conventional night vision devices (i.e., since the 1970's and to the present day) provide several protective functions. One of these protective functions is referred to as "automatic brightness control" (ABC), and another protective function is called "bright source protection" (BSP). The ABC function maintains the brightness of the image provided to the user substantially constant despite changes in the brightness (in the infrared and near-infrared portion of the spectrum) of the scene being viewed. BSP prevents the $I^2T$ from being damaged by an excessively high current level in the event that a bright source, such as a flare or fire, comes into the field of view. These functions are somewhat analogous to area and spot exposure controls on a camera. ABC controls the image brightness using the entire area of the viewed scene, while BSP uses light emission levels from a spot in the scene (which need not be centered in the scene) in order to provide the protective function.

The ABC function is conventionally accomplished by providing a regulator circuit monitoring the output current from the phosphorescent screen electrode (See FIG. 9). When this current exceeds a certain threshold, the field voltage level across the opposite faces of the microchannel plate(s) is decreased to reduce the gain of the microchannel plate(s), as is graphically depicted in FIG. 10. This reduction of microchannel plate voltage also has the effect of reducing the resolution of the I²T. That is, the gain versus voltage function of the I²T at lowered MCP voltages results in a matrix pattern from the microchannel plate(s) appearing in the image. This matrix pattern is sometimes referred to as fixed-pattern noise in the image.

As a result, in bright-field conditions with the ABC feature of a conventional night vision device operating the conventional night vision device may drastically lose resolution so that the user of the device is no longer able to discern details of the viewed scene which would be discernible were they viewed under darker field conditions in which ABC were not applying.

BSP is provided in conventional night vision devices by decreasing the field voltage provided to the photocathode. This voltage reduction happens in the conventional power supply circuit because when a bright object appears in the viewed scene a large number of photons will be incident on an area of the photocathode, and the high impedance of the photocathode in combination with a high resistance value circuit element creates a greater voltage drop under these high current conditions. The large number of photoelectrons provided by the photocathode under these conditions represent a current flow increasing in magnitude with increasing light levels in the viewed field, such that the combined impedance of the photocathode and circuit element causes a decrease in the voltage level effective at the photocathode to move these electrons to the microchannel plate(s).

Recalling FIG. 9, it will be noted that the circuit architecture of the prior art uses two transformers, which are relatively large and heavy components of the circuit. Further, is seen that a typical conventional circuit architecture for a power supply of a night vision device provides a high-value resistor (generally 1–18 G-ohm) to the output of the photocathode voltage multiplier, and a clamping circuit consisting of a voltage source and a low-leakage, high-voltage diode. As photocathode current flows through the high-value resistor, the photocathode voltage will decrease linearly until it reaches a voltage equal to the voltage source (plus the high-voltage low-leakage diode voltage drop). See FIG. 11 for a graphical illustration of this BSP voltage relationship at the photocathode. This voltage is commonly referred to as a clamp voltage, and is typically between 30 and 40 volts D.C.

This conventional method of BSP also has a disadvantage of decreased resolution for the I²T. The reduced electrostatic field between the photocathode and the microchannel plate (s) input causes a reduced resolution for the tube. That is, photoelectrons liberated from the photocathode are not moved to the microchannel plate(s) as effectively, and may not be liberated to reach the microchannel plate(s) at all. This is because photoelectrons must overcome a surface potential barrier at the photocathode in order to be liberated into free space (i.e., into a vacuum within the image intensifier tube), and to be moved by the prevailing electrostatic field to the input of the microchannel plate(s). As the voltage applied to the photocathode decreases (again viewed statistically), some photoelectrons will not be able to overcome this surface potential barrier and will not be liberated into free space. The image information represented by these trapped photoelectrons will be lost from the image provided by the I²T to the user of the night vision device.

SUMMARY OF THE INVENTION

In view of the deficiencies of the conventional related technology, it would be desirable and is an object of this invention to provide an image intensifier tube which overcomes or reduces the severity of at least one deficiency of the conventional technology.

Further, in view of the deficiencies of the conventional related technology, it would be desirable and is an object of this invention to provide a night vision device which overcomes or reduces the severity of at least one deficiency of the conventional technology.

An additional object for this invention is to provide an image intensifier tube which does not employ an ion barrier film on the input face of its microchannel plate(s), and which also does not suffer from ion damage to the photocathode of the image intensifier tube to the extent experienced in conventional image intensifiers in night vision devices.

Yet another object for this invention is to provide a night vision device having such an image intensifier tube along with a power supply which provides both ABC and BSP functions substantially without decreasing either the differential voltage applied to the microchannel plates(s) of the tube or of decreasing the voltage applied to the photocathode of the tube.

Accordingly, it is an object for this invention to provide such a night vision device which has improved resolution under ABC and BSP operating conditions, and which also provides an improved gain in the image intensifier tube.

Additionally, it would be desirable to provide such a power supply for an I²T which, for purposes of BSP under extremely bright-field conditions, does reduce microchannel plate differential voltage, but to a much lower extent of voltage reduction than was used in conventional night vision devices for purposes of ABC.

Still another desirable feature of an improved night vision device, and power supply for an I²T of a night vision device, would be to provide a constant voltage for connection to the photocathode of the I²T.

An advantage for such an improved power supply could be realized if the constant-voltage to the photocathode of the image intensifier tube were gated on and off at a constant duty cycle over part of the current range for the phosphorescent screen of the tube, and were gated at a duty cycle inversely related to current level at this phosphorescent screen of the tube over a portion of the current level range indicative of a need for an ABC function.

Accordingly, is a specific object for this invention to provide a night vision device having an image intensifier tube with a microchannel plate not having an ion barrier film on its inlet face (and therefore, having microchannels which are open to receive photoelectrons directly from a photocathode of the tube) and with an improved power supply for the I²T operating the tube in such a way as to decrease or eliminate ion bombardment damage to the photocathode of the tube.

To this end, the present invention according to one aspect provides a night vision device comprising: an objective lens receiving light from a scene being viewed and directing this light to an image intensifier tube, the image intensifier tube providing a visible image of the scene being viewed, and an eyepiece lens providing this visible image to a user of the night vision device; the image intensifier tube including a photocathode receiving photons from the scene and releasing photoelectrons in a pattern replicating the scene, a microchannel plate having microchannels opening in the direction of the photocathode to receive the photoelectrons and responsively providing a shower of secondary emission electrons in a pattern replicating the scene, and a screen receiving the shower of secondary emission electrons and producing a visible image replicating the scene; the night vision device further including a source of electrical power at a selected voltage level, and a power supply circuit receiving the electrical power at the selected voltage level to responsively provide electrical power at higher voltage levels to the photocathode, to opposite faces of the microchannel plate, and to the screen, the power supply circuit providing a determined voltage level for connection to the photocathode and continually connecting and disconnecting the determined voltage level to and from the photocathode.

Advantages which derive from this invention include the provision of a microchannel plate which does not have an ion barrier film, and yet which is usable in an image intensifier tube with greatly reduced ion bombardment of the photocathode and reduced photocathode damage levels compared to conventional image intensifier tubes. Another advantage is that the improved power supply for an $I^2T$ results in a night vision device which does not experience the loss of resolution in bright field conditions which is common with conventional night vision devices. In fact, resolution, signal-to-noise ratio, and fixed pattern noise of the image intensifier are all preserved at desirably high levels throughout the ABC and BSP operations of the tube and power supply—which is not the case with conventional $I^2T$ power supplies.

Additionally, mean time between failures for the power supply may be improved in comparison to conventional power supplies because parts counts may be reduced. The usable service life of an image intensifier tube operated by a power supply as set out in this disclosure is extended greatly. This improvement service life is obtained also with image tubes having filmed microchannel plates. Moreover, the invention provides an image intensifier tube which does not have a filmed microchannel plate, which provides improved gain and improved signal to noise ratio as a result, and which still has an improved service life over conventional image intensifier tubes, which conventional tubes provide a lower gain.

A further advantage of the present inventive power supply is that the photocathode and microchannel plate at all times enjoy operation at full design voltage level (except for extreme cases of BSP in which voltage to the MCP is reduced slightly). Effectively, gating of the photocathode voltage "simulates darkness" during that portion of the gating cycle in which voltage is off, and keeps the components of the $I^2T$ operating under the ideal conditions of low average current densities that they were designed for.

Still another advantage results from the reduced electron energy necessary to introduce electrons into the microchannels of the MCP in comparison to conventional image intensifier tubes. Because the microchannels of an image intensifier tube embodying the present invention are open in the direction facing the photocathode, no barrier is present to restrict their entry, and the photoelectrons have essentially no barrier to overcome. This is in contrast to conventional proximity focused image intensifier tubes, which have an ion barrier on the input side of the MCP. Electrons must effectively penetrate the ion barrier to get into the microchannels of the conventional image intensifier tube. Thus, the voltage applied to the photocathode of an image tube operated according to the invention can be lowered, and still provide an adequate flow of photoelectrons to the microchannel plate. This advantage allows use of a smaller power supply.

Other objects, features, and advantages of the present invention will be apparent to those skilled in the art from a consideration of the following detailed description of a preferred exemplary embodiment thereof taken in conjunction with the associated figures which will first be described briefly.

BRIEF DESCRIPTION OF THE DRAWING FIGURES

FIG. 2a is a greatly enlarged fragmentary cross sectional view of a portion of the microchannel plate of the $I^2T$ seen in FIG. 2;

Figure 9:
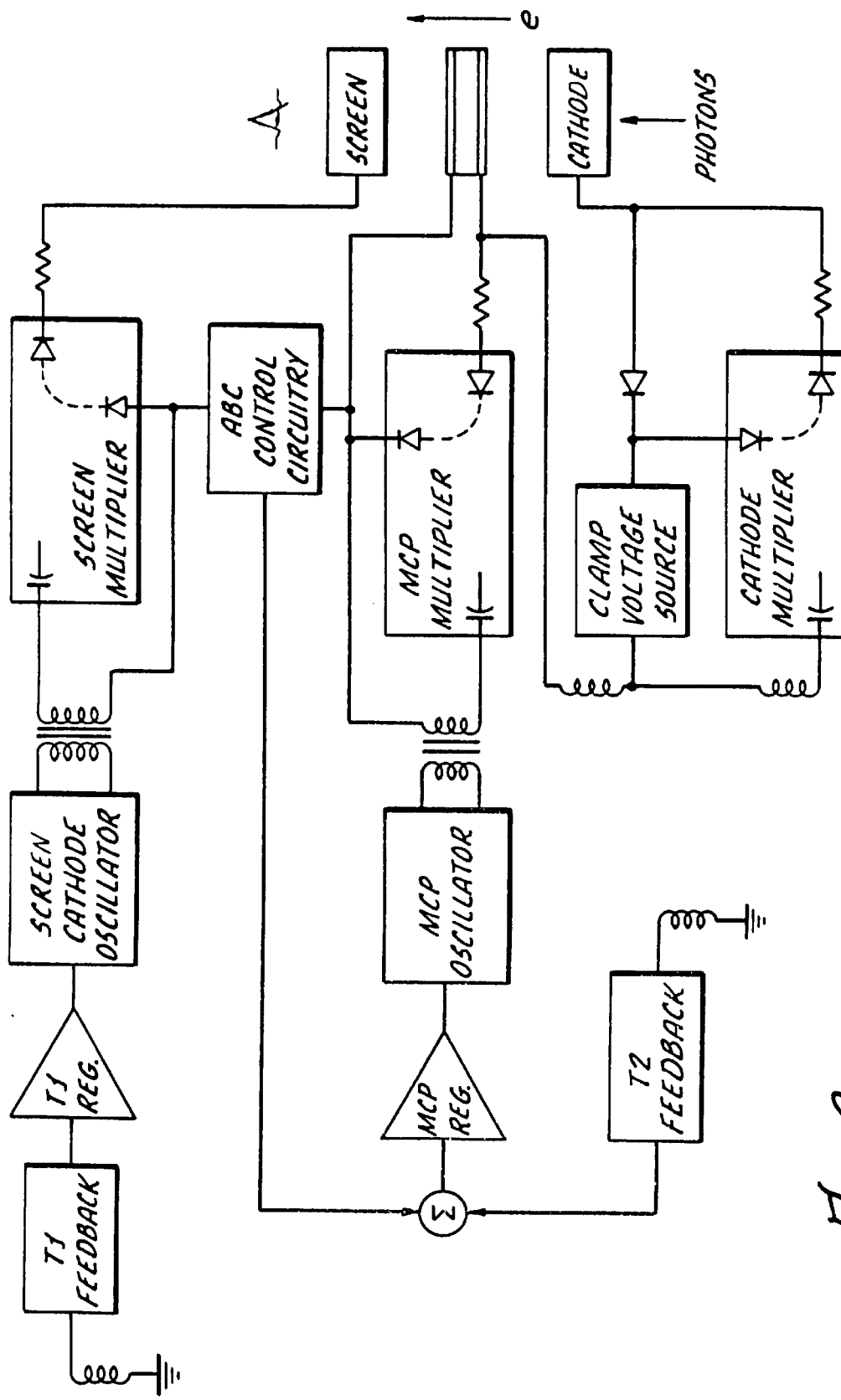
Figure 12:
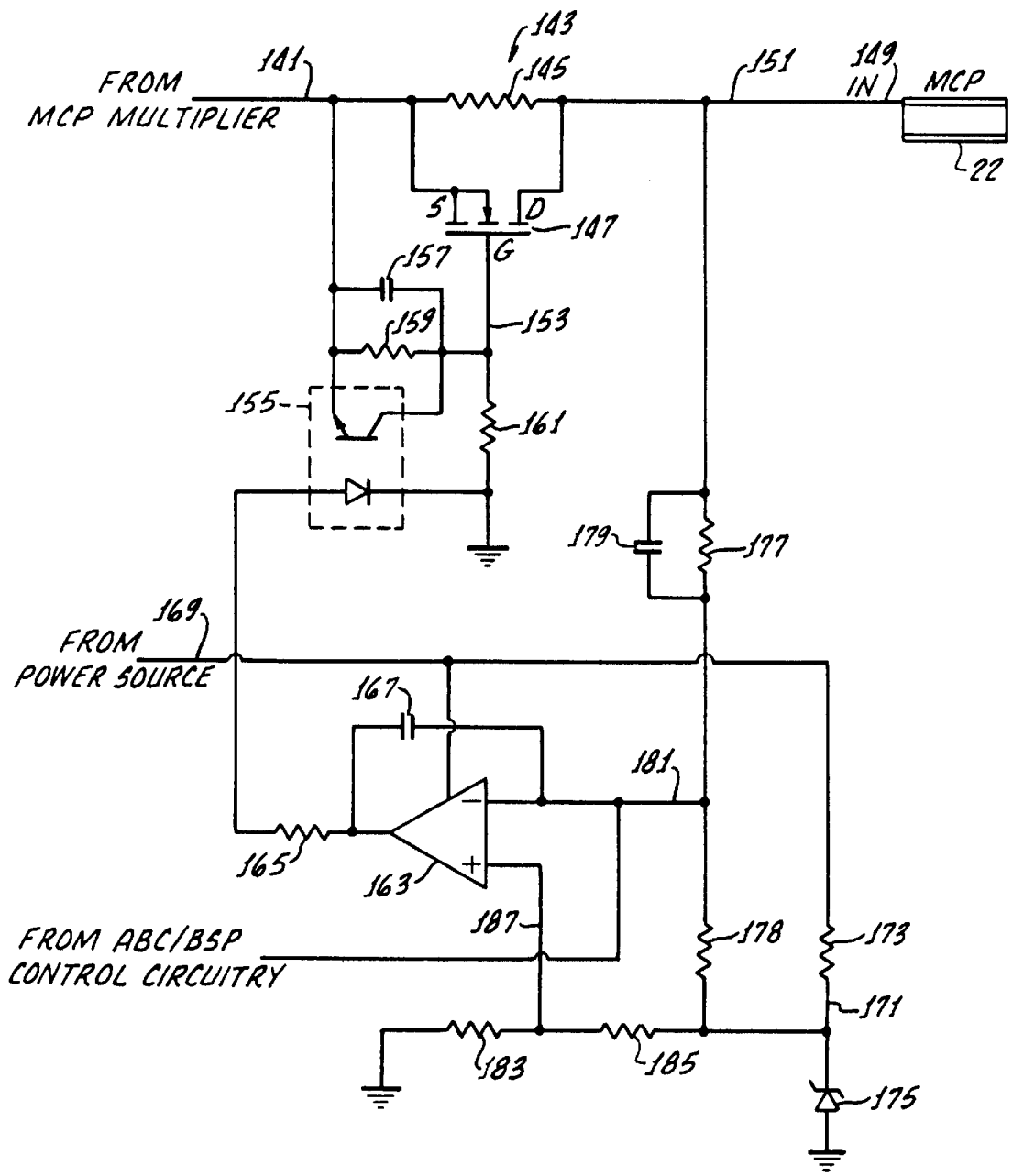

FIGS. 4–8 respectively provide graphical representations of photocathode peak voltage, duty cycle, voltage wave form, microchannel plate voltage, and $I^2T$ output brightness; and FIGS. 9–11 respectively provide a schematic circuit illustration, and graphical representations of microchannel plate voltage and of photocathode voltage for a conventional $I^2T$ power supply.

DETAILED DESCRIPTION OF AN EXEMPLARY PREFERRED EMBODIMENT OF THE INVENTION

While the present invention may be embodied in many different forms, disclosed herein is a specific exemplary embodiment that illustrates and explains the principles of the invention. It should be emphasized that the present invention is not limited to the specific embodiment illustrated.

Figure 1:
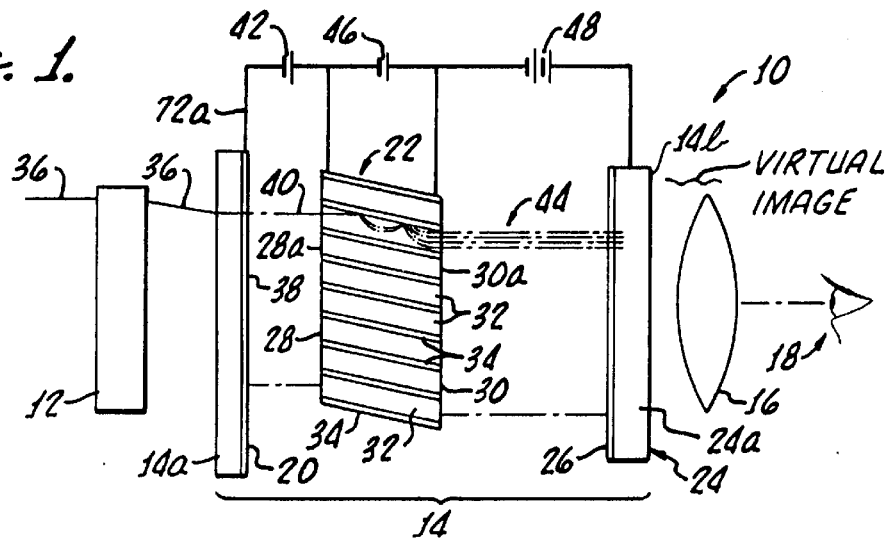
FIG. 1 is a schematic representation of a night vision device embodying the present invention.

Referring first to FIG. 1, there is shown schematically the basic elements of one version of a night vision device 10 of the light amplification type. Night vision device 10 generally comprises a forward objective optical lens assembly 12 (illustrated schematically as a functional block element having a lens depicted in dashed lines—and which may include one or more lens elements). This objective lens 12 focuses incoming light from a distant scene [which may be a day-time scene illuminated with full day light (as will be explained) or may be a night-time scene illuminated with only star light or with infrared light from another source] through the front light-receiving end surface 14a of an $I^2T$ 14 (as will be seen, this surface 14a is defined by a transparent window portion of the tube—to be further described below). As was generally explained above, the $I^2T$ provides an image at light output end 14b in phosphorescent yellow-green visible light, which image replicates the viewed or night-time scene.

Hereinafter, no distinction is maintained between the cases in which the scene is visible with natural vision to the user of the device, and the cases in which the scene is totally invisible because it is illuminated only with star light or other infrared light. The device 10 can provide a visible image replicating the scene for the user at both of these extremes, and at all illumination levels between these extremes. Again, a night time scene would generally be not visible (or would be only poorly visible) to a human's natural vision. This visible image is presented by the device 10 via an eye piece lens illustrated schematically as a single lens 16 producing a virtual image of the rear light-output end of the tube 14 at the user's eye 18.

Figure 2:
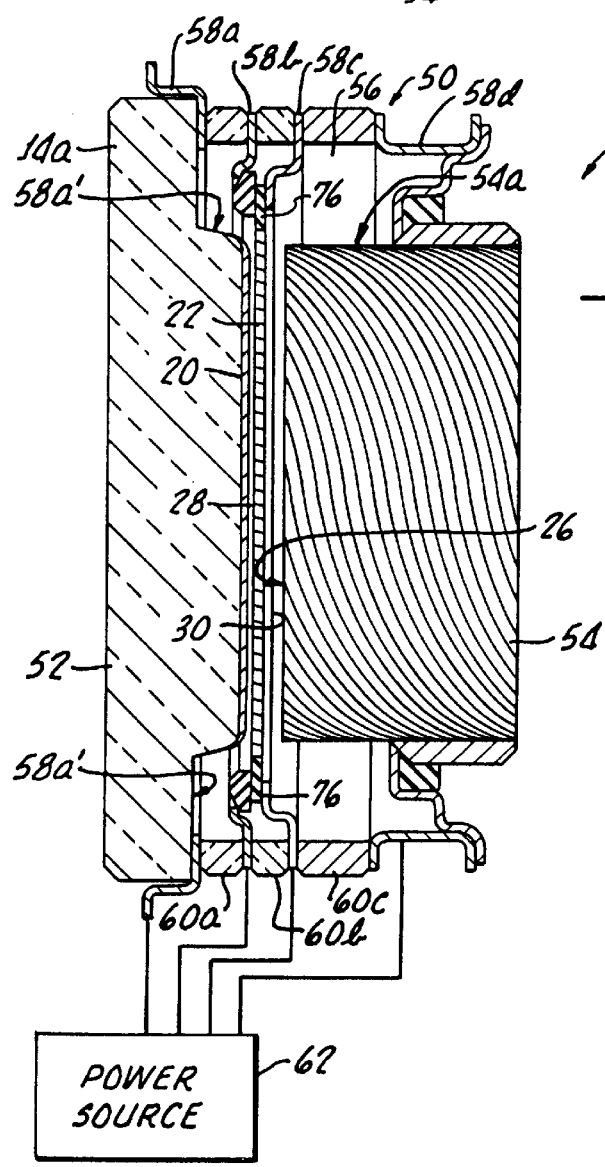
FIG. 2 shows an $I^2T$ in longitudinal cross section, with an associated power supply embodying the present invention.

More particularly now viewing FIG. 2, it is seen that I²T 14 includes a photocathode (PC) 20 which is responsive to photons of infrared light to liberate photoelectrons, a microchannel plate (MCP) 22 which receives the photoelectrons in a pattern replicating the night-time scene, and which provides an amplified pattern of electrons also replicating this scene, and a display electrode assembly 24. In the present embodiment the display electrode assembly 24 may be considered as having an aluminized phosphor coating or phosphor screen 26. When this phosphor coating is impacted by the electron shower from microchannel plate 22, it produces a visible image replicating the pattern of the electron shower. Because the electron shower in pattern intensity still replicates the scene viewed via lens 12, a user of the device can effectively see in the dark, viewing a scene illuminated by only star light or other low-level or invisible infrared light. A transparent window portion of the assembly 24, to be further described below, conveys the image from screen 26 outwardly of the tube 14 so that it can be presented to the user 18. The window portion 24a may be plain glass, or may be fiber optic, as depicted in FIG. 2. Those ordinarily skilled will understand that a fiber optic output window 24a inverts the image provided by the screen 26.

Still more particularly considering FIGS. 2 and 2a, the microchannel plate 22 is located just behind photocathode 20, with the microchannel plate 22 having an electron-receiving face 28 and an opposite electron-discharge face 30. This microchannel plate 22 further contains a plurality of angulated microchannels 32 which open on the electron-receiving face 28 and on the opposite electron-discharge face 30. Microchannels 32 are separated by passage walls 34. At least a portion of the surface of the passage walls 34 bounding the channels 32 is defined by a material 34a, which is an emitter of secondary electrons. In this case, and in contrast to conventional image intensifier tubes of the illustrated proximity focused type, the microchannel plate does not carry an ion barrier on input face 28. Accordingly, the microchannels 32 open on both faces of the plate 22, and are not obstructed at their inlet ends (i.e., at the left end viewing FIGS. 2 and 2a, which is disposed toward photocathode 20) by an ion barrier film. Still viewing FIGS. 2 and 2a, it is seen that each face 28 and 30 carries a conductive electrode layer 28a and 30a, respectively. These conductive electrode layers may be metallic, or may be formed of other conductive material so as to distribute an electrostatic charge over the respective faces of the microchannel plate 22. These electrode coatings do not span across the openings of the microchannels 32, and do not close the openings of these microchannels, so that these microchannels are open in a direction disposed toward the photocathode (again, leftwardly, viewing FIGS. 2 and 2a).

The display electrode assembly 24, generally has a conductive coated phosphor screen 26, is located behind microchannel plate 22 with phosphor screen 26 in electron line-of-sight communication with the electron-discharge face 30 of the MCP 22. The display electrode assembly 24 is typically formed of an aluminized phosphor screen 26 deposited on the vacuum-exposed surface of the optically transparent material of window portion 24a. The focusing eye piece lens 16 is located behind the display electrode assembly 24 and allows an observer 18 to view a correctly oriented image corresponding to the initially received low-level image.

As will be appreciated by those skilled in the art and also viewing now FIG. 2, the individual components of I²T 14 are all mounted and supported in a tube or chamber (to be further explained below) having forward and rear transparent plates cooperating to define a chamber which has been evacuated to a low pressure. This evacuation allows electrons liberated into the vacuum free-space within the tube to be transferred between the various components by prevailing electrostatic fields without atmospheric interference that could possibly decrease the signal-to-noise ratio. Because of the close proximity of the components of this type of image intensifier tube, it is referred to as a "proximity focused" type of tube.

As indicated above, photocathode 20 is mounted immediately behind objective lens 12 on the inner vacuum-exposed surface of the window portion of the tube and before microchannel plate 22. Typically, this photocathode 20 is a circular disk-like structure having a predetermined construction of semiconductor materials, and is mounted on a substrate in a well known manner. Suitable photocathode materials are generally semiconductors such as gallium arsenide; or alkali metals, such as compounds of sodium, potassium, cesium, and antimony (commercially available as S-20), carried on a readily available transparent substrate. A variety of glass and fiber optic substrate materials are commercially available.

Considering in somewhat greater detail the operation of the I²T 14, it is seen that in response to photons 36 entering the forward end of night vision device 10 and passing through objective lens 12, photocathode 20 has an active surface 20a from which are emitted photoelectrons in numbers proportionate to and at locations replicative of the received optical energy of the night-time scene being viewed. Again, and in general, the image received will be too dim to be viewed with human natural vision, and may be entirely or partially of infrared radiation which is invisible to the human eye. It is thus understood that the shower of photoelectrons emitted from the photocathode are representative of the image entering the forward end of I²T 14. The path of a typical photoelectron emitted from the photon input point on the photocathode 20 is represented in FIG. 1 by dashed line 40.

Photoelectrons 40 emitted from photocathode 20 gain energy through an electric field of predetermined intensity gradient established between photocathode 20 and electron-receiving face 28, which field gradient is provided by power source 42. Typically, power source 42 will apply an electrostatic field voltage on the order of 200 to 800 volts to create a field of the desired intensity. After accelerating over a distance between the photocathode 20 and the input surface 28 of the microchannel plate 22, these photoelectrons 40 enter microchannels 32 of microchannel plate 22. As will be discussed in greater detail below, the photoelectrons 40 are amplified by emission of secondary electrons to produce a proportionately larger number of electrons upon passage through microchannel plate 22. This amplified shower of secondary-emission electrons 44, also accelerated by a respective electrostatic field generated by power source 46, then exits microchannels 32 of microchannel plate 22 at electron-discharge face 30.

Once in free space again, the amplified shower of photoelectrons and secondary emission electrons is again accelerated in an established electrostatic field provided by power source 48. This field is established between the electron-discharge face 30 and display electrode assembly 24. Typically, the power source 48 produces a field on the order of 3,000 to 7,000 volts, and more preferably on the order of 6,000 volts in order to impart the desired energy to the multiplied electrons 44.

The shower of photoelectrons and secondary-emission electrons 44 (those ordinarily skilled in the art will know that considered statistically, the shower 44 is almost or entirely devoid of photoelectrons and is made up entirely or almost entirely of secondary emission electrons. Statistically, the probability of a photoelectron avoiding absorption in the microchannels 32 is low). However, the shower 44 is several orders of magnitude more intense than the initial shower of photoelectrons 40, but is still in a pattern replicating the image focused on photocathode 20. This amplified shower of electrons falls on the phosphor screen 26 of display electrode assembly 24 to produce an image in visible light.

Viewing FIG. 2 in greater detail, the I$^2$T 14 is seen to include a tubular body 50, which is closed at opposite ends by a front light-receiving window 52, and by a rear fiber-optic image output window 54. The window 54 defines the light output surface 14b for the tube 14, and carries the coating 26, as will be further described. As is illustrated in FIG. 2, the rear window 54 may be an image-inverting type (i.e., with optical fibers bonded together and rotated 180° between the opposite faces of this window 54 in order to provide an erect image to the user 18. The window member 54 is not necessarily of such inverting type. Both of the windows 52 and 54 are sealingly engaged with the body 50, so that an interior chamber 56 of the body 50 can be maintained at a vacuum relative to ambient. The tubular body 50 is made up of plural metal rings, each indicated with the general numeral 58 with an alphabetical suffix added thereto (i.e., 58a, 58b, 58c, and 58d) as is necessary to distinguish the individual rings from one another.

The tubular body sections 58 are spaced apart and are electrically insulated from one another by interposed insulator rings, each of which is indicated with the general numeral 60, again with an alphabetical suffix added thereto (i.e., 60a, 60b, and 60c). The sections 58 and insulators 60 are sealingly attached to one another. End sections 58a and 58d are likewise sealingly attached to the respective windows 52 and 54. Those ordinarily skilled in the pertinent arts will know that the body sections 58 are individually connected electrically to a power supply 62 (which provides sources 42, 46, and 48, as described above), and which is effective during operation of the I$^2$T 14 to maintain an electrostatic field most negative at the section 58a and most positive at the section 58d.

Further viewing FIG. 2, it is seen that the front window 52 carries on its rear surface within the chamber 56 the photocathode 20. The section 58a is electrically continuous with the photocathode by use of a thin metallization (indicated with reference numeral 58a') extending between the section 58a and the photocathode 20. Thus, the photocathode by this electrical connection and because of its semi-conductive nature, has an electrostatic charge distributed across the areas of this disk-like photocathode structure. Also, a conductive coating or layer 28a, 30a is provided at each of the opposite faces 28 and 30 of the microchannel plate 22 (as is indicated by arrowed numerals 28a and 30a). Power supply 46 is conductive with these coatings by connection to housing sections 58b and 58c. Finally, the power supply 48 is conductive with a conductive layer or coating (possibly an aluminum metallization, as mentioned above) at the display electrode assembly 24 by use of a metallization also extending across the vacuum-exposed surfaces of the window member 54, as is indicated by arrowed numeral 54a.

It should be noted in considering the description below of the structure and operation of the power supply 62, that the term "image intensifier tube" is used in a generic sense. Those ordinarily skilled in the pertinent arts will appreciate that the tube being powered may be configured as an electron multiplier tube in which the output is an electrical signal rather than a visible image. Also, the tube being powered may be of the photodetector, phosphorescence detector, or scintillation detector type, in which the output is also an electrical signal rather than a visible image. Such tubes are generally used, for example, to detect a phosphorescent response in a chemical reagent exposed to exciting light of another color or wavelength, or in a detector for high-energy events having as a result of their occurrence the production of a small number of photons (i.e., as few as one photon per event).

Such application of tubes having a photocathode and a dynode (either of microchannel plate configuration with many dynodes, or of another configuration with one or more dynodes) may experience some or all of the difficulties in operation which are described above in the context of night vision devices. Accordingly, it will be appreciated that a power supply embodying principles of this invention may be used in such applications.

Figure 3:
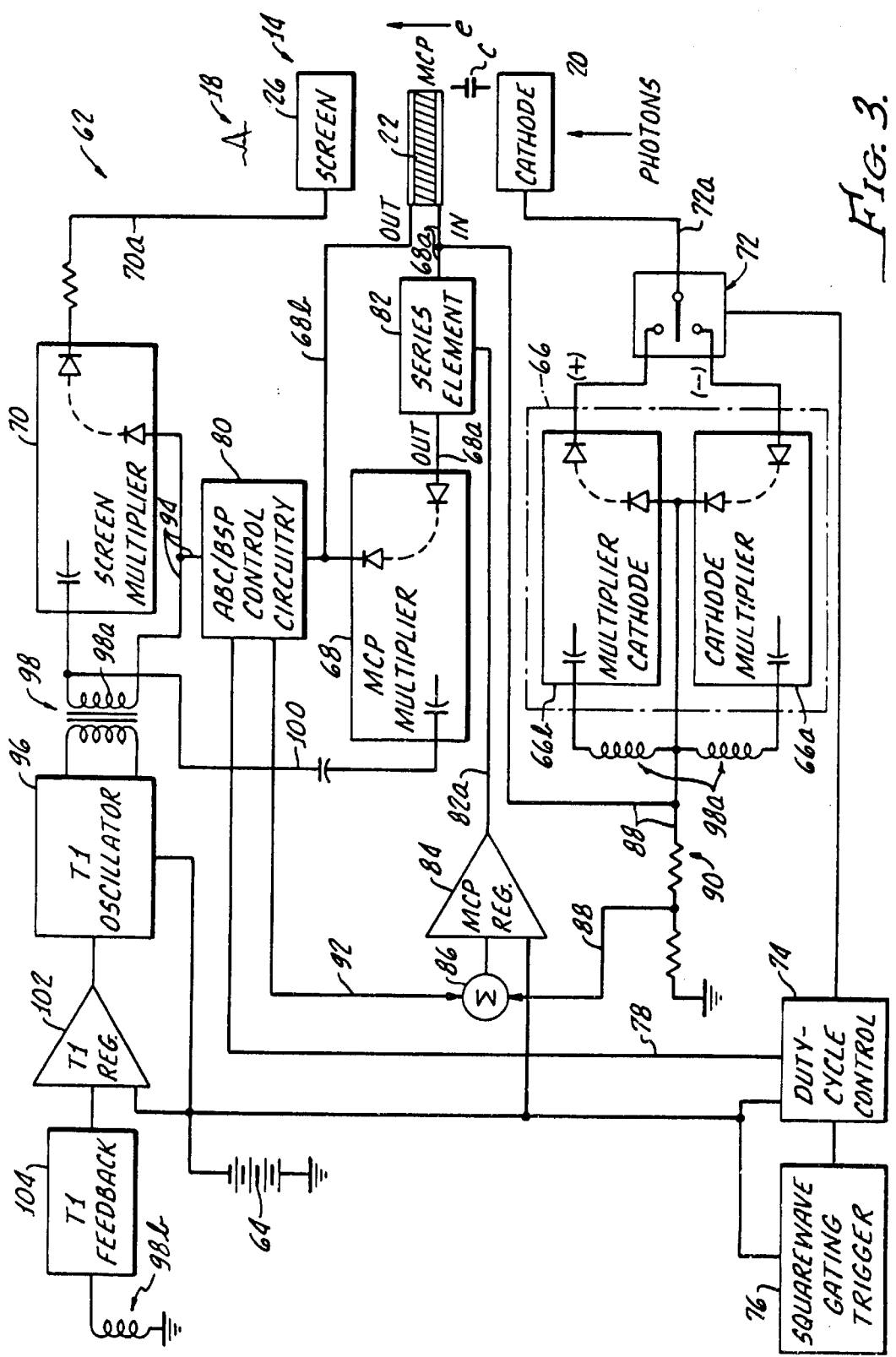
FIG. 3 is a schematic representation of an improved power supply for an $I^2T$ embodying the present invention.

Considering now FIG. 3, it is seen that the power supply 62 includes a power source, which in this case is illustrated as a battery 64. It will be appreciated that a battery 64 is generally used as the power source for portable apparatus, such as night vision devices. However, the invention is not limited to any particular power source. For example, a regulated line-power source could be used to provide input power to a power supply implementing and embodying the principles of the present invention. Considered generally, the power supply 62 includes three voltage multipliers or voltage converters, respectively indicated with the numerals 66, 68, and 70. The voltage converter 66 for the photocathode 20 includes two converters of differing voltage level, and indicated with the numerals 66a and 66b (note that the converter 66b provides a voltage level which is positive with respect to the face 28 of MCP 22, while converter 66a provides a voltage level which is negative relative to the face 28 of the MCP 22.

A tri-stable switching network 72 switches controllably between alternative positions either conducting the photocathode 20 to voltage converter 66a, to an open circuit position, or to voltage converter 66b, all via the conductive connection 72a. A duty cycle control 74 controls the switching position of the switching network 72, and receives as inputs a square wave gating trigger signal from an oscillator 76, and a control signal via a conductor 78 from an ABC/BSP control circuit 80. It will be appreciated that the switching network 72 may be configured to switch (i.e., to toggle) between voltage sources 66a and 66b without having an open-circuit condition. This alternative would yield essentially a square-wave voltage on the graph of FIG. 6.

Power supply to the microchannel plate 22 (that is, to the conductive layers or metallizations 28a and 30a) is effected from the voltage converter 68 via connections 68a and 68b. Interposed in connection 68a is a series element 82, which in effect is a controllably variable resistor. A high-voltage MOSFET, for example, may be used for element 82, and the resistance of this element is controlled over a connection 82a by a regulator circuit 84. Regulator circuit 84 receives a feed back control signal from a summing junction 86, which receives an input from conductor 88 via a level-adjusting resistor 90, and also receives an input via conductor 92 from the ABC/BSP control circuit 80. Conductor 88 also provides a feed back signal of the voltage level applied to the input face 28 (i.e., at metallization 28a) of the microchannel plate 22 into the voltage converter circuit 66. Note that this conductor 88 provides a reference voltage level of microchannel plate voltage on face 28 (electrode 28a), not a signal of photocathode voltage level.

The voltage converter 70 has connection to the screen 26 via a connection 70a, and provides a feed back of screen current level into ABC/BSP control circuit via conductor 94. Energy flow in the circuit 62 is provided by an oscillator 96 and coupled transformer 98, with plural output windings 98a providing energy input to voltage converters 66 and 70, and a conductor 100 providing energy to voltage converter 68. It is noted that the circuit 62 requires only the single transformer 98, which advantageously reduces cost, size, weight, and parts count for the power supply; and also improves reliability for the power supply and night vision device 10. The oscillator 96 receives a control feed back via a regulator 102 and a feed back circuit 104, having an input from a feedback winding 98b of transformer 98.

Having considered the structure of the circuit 66, attention may now be given to its operation, and the cooperation of this circuit operation with the operation of the I²T 14. Attention now to FIGS. 4–8, with attention first to FIG. 4, shows that the most negative voltage level produced by voltage converter 66a for application by power supply circuit 66 to the photocathode 20 of the tube 14 is always constant at a selected voltage level. Comparing this FIG. 4 to the voltage curve of FIG. 11 reveals that the prior art teaches to vary the voltage applied to the photocathode in order to provide a BSP function. However, FIG. 5 shows that the power supply circuit 66 provides a BSP function by keeping the voltage applied to the photocathode 20 constant (recalling FIG. 4) while gating connection of the photocathode between connection to this constant voltage source (i.e., about –800V), to an open circuit (i.e., voltage off), and to a lower voltage (i.e., relatively more positive relative to the face 28 of MCP 22—about +30V) provided by voltage converter 66b (simulating darkness for the photocathode 20). When the photocathode 20 is connected to voltage source 66b (i.e., to a source of about +30 volts relative to the face 28 of MCP 22), this condition might be considered a "hard turn off" for the photocathode. Under this condition, the photocathode is not responsive to photons received from the scene being viewed. This gating function is carried on at a constant cyclic rate and cycle interval, while varying the duty cycle of the applied constant voltage preferably as a function of current level sensed at screen 26 (i.e., by feed back over conductor 94).

It should be noted, however, that this voltage gating function for photocathode 20 can be carried out with respect to other parameters of operation of the image intensifier tube 14. For example, an alternative way of controlling the gating function would be to use the current level at face 30 i.e., at electrode 30a) as a controlling parameter.

FIG. 5 shows that over a range of screen current indicated with the numeral 106, the duty cycle of the applied constant voltage to the photocathode 20 is fixed at 100%. However, at screen current levels above a selected level, the duty cycle progressively ramps down substantially linearly to a low level of essentially $10^{-4}$% as a function of increasing screen current, as is indicated by numeral 108. It will be noted that FIGS. 5 and 7 are drawn to the same scale of screen current along the abscissa of the of the graph, and that these graphs are arranged one vertically above the other for the reader's convenience in understanding the relationship of photocathode gating duty cycle to voltage applied to the microchannel plate 22.

Returning attention to FIG. 5 and with attention now to FIG. 6 it is seen that for screen current levels above that at which the duty cycle for gating of the constant voltage to the photocathode 20 reaches its lowest value, an additional function of BSP is provided by decreasing the voltage applied to the microchannel plate 22 (indicated by the encircled portion 110 of FIG. 7). It will be noted that for all screen current levels lower than those necessary to initiate this BSP protection function, the voltage applied across the microchannel plate 20 is a constant. Thus, the microchannel plate 22 operates at its designed voltage differential across electrodes 28a and 30a. The reduction of voltage level applied across the microchannel plate 20 is effected by action of the series element 82 increasing its resistance under control of MCP regulator 84. As noted this regulator 84 receives a summed input from the conductor 88 via the level adjusting resistor 90, and from the ABC/BSP control circuit 80, which itself is responsive to the level of current sensed at screen 26 by conductor 94.

Comparing this operation of power supply circuit 62 to the operation of the conventional power supply discussed above with reference to FIGS. 9–11, and viewing particularly FIG. 10, it is seen that the power supply 62 avoids the problem of loss of resolution for an I²T, which is caused in the conventional power supplies by operation with too low a differential voltage across a microchannel plate.

The voltage wave form of FIG. 6 might be produced by a rapid increase of light input such that the ABC function, and then the BSP function operate in succession. For purposes of illustrating this action, FIG. 6 is also annotated with a time arrow, indicating that in this instance time proceeds from left to right on the graph. It will be noted that the constant voltage level gated to the photocathode 20 (i.e., from voltage converter 66a) is substantially –800V, while the positive voltage level from voltage converter 66b is about +30 volts relative to the face 28 (electrode 28a) of the microchannel plate 22.

The reader should not be confused by the similarity in appearance between the graph of FIG. 10 and that of FIG. 5, they are illustrating differing values. FIG. 10 relates to conventional microchannel plate voltage, while FIG. 5 is voltage gating duty cycle to the photocathode 20 as provided by the power supply 62.

In view of the above, attention now to FIG. 6 provides an understanding of the microchannel plate voltage level as the duty cycle for the application of the constant peak voltage seen in FIG. 4 is varied in response to changing light levels in the viewed scene, and in response to the changes in screen current level for the I²T. FIG. 6 shows that portion of the duty cycle operation corresponding to portions 108 and 110 of FIGS. 5 and 7. Increasing light levels and increasing screen current levels go from left to right on the graph of FIG. 6. It will be noted that a portion of the graph of FIG. 6 is not shown (i.e., to the left of that part shown). This portion which is not shown would correspond to section 106 of FIG. 5, and in this realm of operation the duty cycle is always 100%.

At the left side of the graph of FIG. 6, it is seen that the duty cycle is here slightly less than 100%, and that within the interval for each duty cycle the voltage applied to photocathode 20 is initially the high constant peak voltage indicated in FIG. 4 (i.e., indicated at numerals 112), and then decays over a very short time interval at a natural open-circuit, capacitor-discharge rate (indicates at segments 114 of the voltage curve). This voltage decay is actually a very small voltage because of the short time interval, and occurs because the virtual capacitor existing between the photocathode 20 and the conductive metallization on the front light-receiving face of the microchannel plate 22 (i.e., conductive coating 28a) is open-circuit when the switching network 72 (recalling FIG. 3) is not conducting the photocathode to neither voltage converter 66a or to voltage converter 66b. This virtual capacitor is diagrammatically indicated on FIG. 3, and indicated with the character "C".

Next in each duty cycle, the network 72 conducts the photocathode to voltage converter 66b (i.e., about positive 30 volts) which effectively replicates darkness for the photocathode 20 by dropping the voltage as is indicated at voltage cutoff's 116 of FIG. 6. Effectively, this dropping (i.e., more positive) voltage level for the photocathode 20 is a hard turn off. That is, when the applied voltage at the photocathode 20 is about +30 volts relative to the face 28 of microchannel plate 22, then electrons will not flow from this photocathode to the microchannel plate in response to photon of light hitting the photocathode. This voltage cutoff 116 is provided by having voltage converter 66b provide a voltage which is about 30 volts positive with respect to the voltage provided at coating 28a on the front face of the microchannel plate 22 by voltage converter 68.

Restated, it is seen that in essence when the photocathode 20 operates, it always operates substantially at the high constant peak voltage seen in FIG. 4. When the photocathode 20 is not operating, it is switched to a voltage which replicates a dark field for the photocathode (i.e., the +30 volts from voltage converter 66b). The photocathode 20 operated by the power supply 62 of the present invention is switched between operation at its designed voltage level and dark-field condition at a duty cycle which varies dependent upon the light intensity of the scene being viewed, as indicated by current flow at the screen 26. This function is carried out in accord with the duty cycle function indicated in FIG. 5 in order to provide ABC. The result of this ABC operation is illustrated in FIG. 8, which indicates that over a broad range of input light levels, a substantially constant brightness for the image presented to a user of the night vision device 10 is achieved. At the left-hand side of FIG. 8 is seen a linearly decreasing section of the brightness curve from the image intensifier tube 14. This occurs with very dim lighting levels, but the image intensifier tube 14 will still provide a usable image in at least a portion of this regime of its operation.

Returning to consideration of FIGS. 5 and 7, within section 108, the duty cycle is progressively decreased until it reaches it low level of $10^{-4}\%$ as a function of increasing screen current. If light level of the viewed scene continues to increase (indicative of a bright source in the scene), then the duty cycle maintains its low $10^{-4}\%$ level, while the bright source protection function explained above is effected in section 110, recalling FIG. 7.

Having explained the operation of power supply circuit 62 and its cooperation with the image intensifier tube 14, attention can now be given to the effect this power supply operation is believed to have on the migration of positive ions within an image intensifier tube. These positive ions (which are generally atoms of hydrogen and other gasses which can never be entirely removed from the vacuum space 56) travel in the direction opposite to the electron flow because of the electrostatic fields maintained within the tube 14. Thus, positive ions travel toward and bombard photocathode 20. However, in the present device, the voltage applied to the photocathode is not always negative, is intermittent, and is positive part of the time. Thus, positive ions are believed to be moved toward the photocathode less constantly than is conventionally the case. Further, the positive ion bombardment of the photocathode 20 appears to be much less damaging in the present inventive combination. For this reason, the MCP 22 of the present invention need not carry an ion barrier film on the surface 28, and the number of photoelectrons received into the MCP 22 is improved by about 50% by this reason alone. Thus, a NVD embodying the present invention can provide a much better amplification of light, and an improved operating life span for the tube 14.

Those skilled in the art will appreciate that the embodiment of the present invention depicted and described herein and above is not exhaustive of the invention. For example, the ABC and BSP aspects of the invention may be implemented separately of one another if desired. Those skilled in the art will further appreciate that the present invention may be embodied in other specific forms without departing from the spirit or central attributes thereof. Because the foregoing description of the present invention discloses only an exemplary embodiment thereof, it is to be understood that other variations are recognized as being within the scope of the present invention. Accordingly, the present invention is not limited to the particular embodiment which has been described in detail herein. Rather, reference should be made to the appended claims to define the scope and content of the present invention.

I claim:

1. A night vision device comprising:
   an objective lens receiving light from a scene being viewed and directing this light to an image intensifier tube, said image intensifier tube providing a visible image of the scene being viewed, and an eyepiece lens providing this visible image to a user of the night vision device;
   said image intensifier tube including a photocathode receiving photons from the scene and releasing photoelectrons in a pattern replicating the scene, a microchannel plate having microchannels opening in the direction of said photocathode to receive the photoelectrons and responsively providing a shower of secondary emission electrons in a pattern replicating the scene, and a screen receiving the shower of secondary emission electrons and producing a visible image replicating the scene;
   said night vision device further including a source of electrical power at a selected voltage level, and
   a power supply circuit receiving said electrical power at said selected voltage level to responsively provide electrical power at plural higher voltage levels to each of: said photocathode, to opposite faces of said microchannel plate, and to said screen; said power supply circuit providing as one of said plural higher voltage levels a determined voltage level which is available for connection to said photocathode; and said power supply circuit including a switching means continually connecting and disconnecting said determined voltage level to and from said photocathode.

2. The night vision device of claim 1 wherein said power supply circuit also provides as one of said plural higher voltage levels another voltage level which is also available for connection to said photocathode, and said switching means of said power supply circuit continually switching said photocathode between connection with said determined voltage level and alternative connection with said another voltage level.

3. The night vision device of claim 1 wherein said another voltage level is a positive voltage.

4. The night vision device of claim 3 wherein said switching means of said power supply circuit sequentially connects said photocathode first to said determined voltage level, and then to open circuit having no connection to either said determined voltage level or to said another voltage level.

5. A night vision device having an objective lens receiving light from a scene being viewed and directing this light to an image intensifier tube, said image intensifier tube providing a visible image of the scene being viewed, and an eyepiece lens providing this visible image to a user of the night vision device;

said image intensifier tube including a photocathode receiving photons from the scene and releasing photoelectrons in a pattern replicating the scene, a microchannel plate having a multitude of microchannels which open without obstruction toward said photocathode to receive the photoelectrons, said microchannel plate responsively providing a shower of secondary emission electrons in a pattern replicating the scene, and a screen receiving the shower of secondary emission electrons and producing a visible image replicating the scene;

said night vision device including a source of electrical power at a selected voltage level; and a power supply circuit receiving said electrical power at said selected voltage level to responsively provide plural higher voltage levels to each of: said photocathode, to opposite faces of said microchannel plate, and to said screen;

wherein said power supply circuit further includes a voltage converter circuit providing as one of said plural higher voltage levels a determined voltage level which is available for connection to said photocathode, and said power supply circuit also providing another voltage converter circuit providing another voltage level which is also available to be connected to said photocathode, said another voltage level being relatively positive; and a switching device continually opening and closing connection of said determined voltage level to said photocathode and alternatingly connecting said another voltage level to said photocathode.

6. The night vision device of claim 5 wherein said switching device in a sequential gating cycle and after connection of said photocathode to said voltage converter circuit which is providing a relative negative voltage level to said photocathode, then connects said photocathode to open circuit in which said photocathode has connection to neither one of said voltage converter circuit or to said another voltage converter circuit.

7. A method of operating a night vision device, said night vision device having an objective lens receiving light from a scene being viewed and directing this light to an image intensifier tube, said image intensifier tube providing a visible image of the scene being viewed, and an eyepiece lens providing this visible image to a user of the night vision device; said image intensifier tube including a photocathode receiving photons from the scene and releasing photoelectrons in a pattern replicating the scene, a microchannel plate receiving the photoelectrons and providing a shower of secondary emission electrons in a pattern replicating the scene, and a screen receiving the shower of secondary emission electrons and producing the visible image replicating the scene; said method including steps of:

providing both a constant negative voltage level available to be switched to said photocathode, and also providing a voltage level which positive relative to a first face of the microchannel plate and which is also available to be switched to said photocathode;

continuously alternating connection of said photocathode between said constant negative voltage level and said relative positive voltage level; and providing said microchannel plate with a multitude of microchannels which are open and unobstructed in a direction toward said photocathode to receive photoelectrons liberated by said photocathode.

8. The method of claim 7 further including the steps of providing for said connection of said photocathode between said negative and said relatively positive voltage levels to be varied in a variable duty cycle, and maintaining said variable duty cycle at substantially 100% over a first range of screen current, and progressively decreasing said duty cycle from 100% to a lower level over a second range of screen current.

9. The method of claim 8 including the selection of said lower level for said duty cycle to be substantially $10^{-4}\%$.

10. The method of claim 9 further including the steps of providing a voltage differential across said microchannel plate, and decreasing said voltage differential across said microchannel plate after said variable duty cycle has decreased to a selected level.

11. A method of operating an image intensifier tube, said image intensifier tube including a photocathode receiving photons and releasing photoelectrons, a microchannel plate receiving the photoelectrons and providing a shower of secondary emission electrons, and a screen receiving the shower of secondary emission electrons and producing a visible image; said method including steps of:

providing said microchannel plate with a multitude of microchannels open and unobstructed in a direction toward said photocathode;

providing a constant negative voltage level available to be switched to said photocathode;

providing a voltage level which is positive with respect to a first face of the microchannel plate; and continuously switching said photocathode alternatingly from said constant voltage level to said relative positive voltage.

12. The method of claim 11 further including the steps of: providing for said switching to be performed in a variable duty cycle, maintaining said variable duty cycle at substantially 100% over a first range of screen current, and progressively decreasing said duty cycle from 100% to a lower level over a second range of screen current.

13. The method of claim 12 further including the step of selecting said lower level to be substantially $10^{-4}\%$.

14. The method of claim 13 further including the steps of providing a voltage differential across said microchannel plate, and decreasing said voltage differential across said microchannel plate to a lower level after said variable duty cycle has reached a selected low level.

15. The method of claim 14 wherein said voltage differential across said microchannel plate is reduced after said variable duty cycle is decreased to substantially $10^{-4}\%$.

16. A method of operating an image intensifier tube, said image intensifier tube including a photocathode receiving photons and releasing photoelectrons, a microchannel plate receiving the photoelectrons and providing a shower of secondary emission electrons, and a screen receiving the shower of secondary emission electrons and producing a visible image; a power supply providing selected voltage levels to each of said photocathode, to opposite faces of said microchannel plate, and to said screen; said method including steps of:

providing said microchannel plate with a multitude of microchannels opening and unobstructed in a direction toward said photocathode;

utilizing said power supply to provide a respective voltage level for each of opposite faces of said microchannel plate and for said screen;

utilizing said power supply to provide a negative voltage level available to be switched to said photocathode, and another relative positive voltage level which is also available to be switched to said photocathode and which is positive relative to a voltage level provided to a first of said opposite faces of said microchannel plate;

continuously switching connection of said photocathode alternatingly from said negative voltage level to said relative positive voltage level.

17. The method of claim 16 further including the steps of switching said voltage levels to said photocathode in a variable duty cycle, and maintaining said variable duty cycle at substantially 100% over a first range of screen current, and progressively decreasing said duty cycle from 100% to a lower level over a second range of screen current.

18. The method of claim 17 wherein said lower level is selected to be substantially $10^{-4}$%.

19. A dynode-array light responsive device, said device comprising:

a tube having a photocathode, a microchannel plate defining plural dynodes, and an output electrode;

said photocathode responding to photons of light to liberate photoelectrons within said tube, said microchannel plate having plural microchannels which are open and unobstructed in a direction toward the photocathode to received photoelectrons liberated by said photocathode;

said plural microchannels each responsively providing secondary emission electrons to define respective dynodes of an array, and thereby providing a shower of secondary emission electrons to said output electrode;

a source of electrical power at a selected voltage level, and a power supply circuit receiving electrical power at said selected voltage level to responsively provide plural higher voltage levels respectively to said photocathode, to said pair of opposite faces of said microchannel plate, and to said output electrode; said power supply circuit further providing a positive voltage level, and said power supply circuit including a switching device continuously switching connection of said photocathode to and from said higher voltage level alternatingly with connection of said photocathode to and from connection with said positive voltage level.

20. A method of operating an image intensifier tube, said image intensifier tube providing a shower of electrons replicating a scene being viewed; said image intensifier tube including a photocathode liberating photoelectrons in response to photos from a scene, a microchannel plate receiving the photoelectrons and responsively providing a shower of secondary emission electrons in a pattern replicating the scene, and an output electrode receiving the shower of secondary electrons and responsively providing image information; said method including steps of:

providing said microchannel plate with plural microchannels opening without obstruction toward the photocathode;

providing a negative voltage level available to be switched to said photocathode;

providing a relative positive voltage level;

in a duty cycle continually toggling connection of said photocathode between said negative voltage level and said relative positive voltage level.

* * * * *